A. C. THOMPSON AND W. S. ROBINETT.
THERMOSTAT VALVE.
APPLICATION FILED FEB. 7, 1920.
1,369,854.
Patented Mar. 1, 1921.
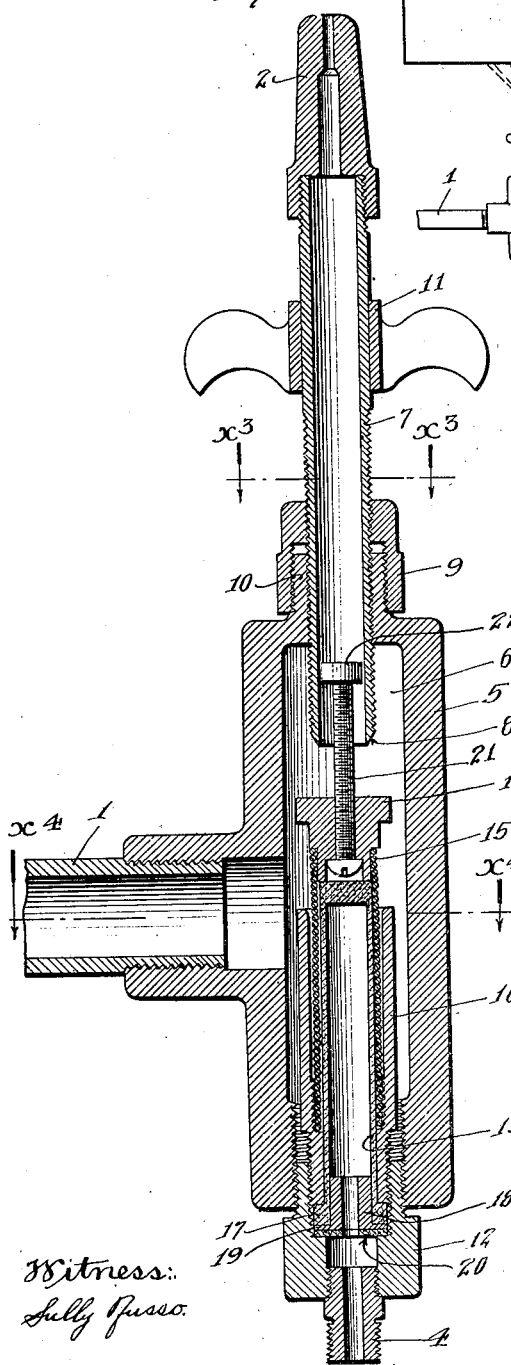
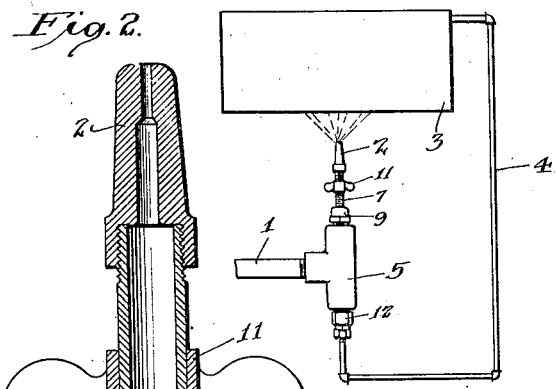
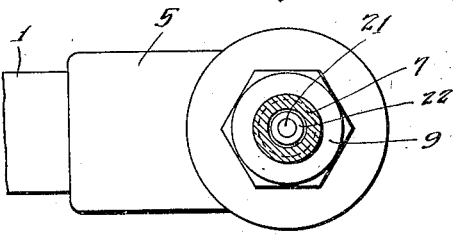
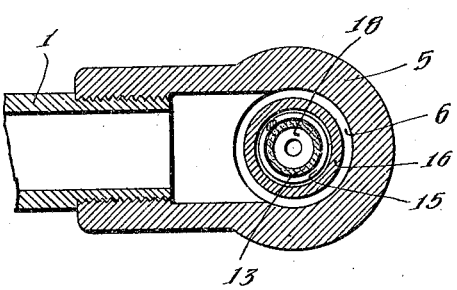
Witness:
Sully Russo.
Inventors
Arthur C. Thompson
Winfield S. Robinett
By Frederick W. Lyon, atty

UNITED STATES PATENT OFFICE.

ARTHUR C. THOMPSON AND WINFIELD S. ROBINETT, OF PASADENA, CALIFORNIA.

THERMOSTAT-VALVE.

1,369,854.      Specification of Letters Patent.      Patented Mar. 1, 1921.

Application filed February 7, 1920. Serial No. 357,073.

*To all whom it may concern:*

Be it known that we, ARTHUR C. THOMPSON and WINFIELD S. ROBINETT, citizens of the United States, residing at Pasadena, in the county of Los Angeles and State of California, have invented a new and useful Thermostat-Valve, of which the following is a specification.

This invention relates to a thermostat valve and is particularly directed to a valve mechanism operated by a thermostat unit to control the supply of fuel to a burner, with the thermostatic unit operated by the pressure in the tank or chamber heated by the burner.

The object of the invention is to provide a thermostat valve incorporated in a fuel supply line for regulating the flow of fuel through said supply line.

Another object is to provide a thermostat valve unit which is very sensitive, functioning under minute variations in the valve controlling pressure.

A further object is to provide a thermostat valve, so designed that the various elements may be formed of stock material and parts produced by automatic screw-machines, this feature contributing to minimizing the cost of manufacture.

Various other objects and advantages will be more fully apparent from the following description of the accompanying drawings which form a part of this disclosure, and which illustrate a preferred form of embodiment of the invention.

Of the drawings:

Figure 1 is an elevation of the valve unit showing an installation wherein it serves as a control device for a gas burner and operated by the pressure in the tank being heated.

Fig. 2 is a vertical section through the valve unit and burner.

Fig. 3 is a plan section on line $x^3$—$x^3$ of Fig. 2.

Fig. 4 is a plan section on line $x^4$—$x^4$ of Fig. 2.

In the installation shown in Fig. 1, the valve unit is connected with a fuel supply pipe 1 with the burner 2 positioned to cause the tank 3 to be heated, a control pressure line 4 leading from the upper portion of the tank to the valve unit.

The valve unit comprises a body portion or casing 5 which in the present preferred form is a T-fitting providing a valve chamber 6. At the upper end of the chamber the body has a screw-threaded bore into which engages a discharge pipe 7 with its inner end extended into said chamber and formed to provide a valve seat 8. By rotating the pipe 7 the axial position of the valve seat relative to the coacting valve mechanism may be regulated to control the fuel supply. A lock collar 9 engaging the threaded pipe 7 and a threaded boss 10 of the valve body may be tightened to lock the discharge pipe 7 in adjusted position and a wing collar 11 secured to the pipe serves to facilitate said adjustment. The burner 2 is preferably screw threaded on the upper end of the pipe 7.

The thermostat valve mechanism is supported by a bushing 12 screw threaded into the lower end of the body 5 and comprises a hollow tubular expansion element 13 having a closed upper end and formed of pliable rubber, and a valve element 14 which is pressed into the upper end of a coiled contractible spring 15 surrounding the rubber tube 13, the lower end of said spring having a screw thread engagement with a threaded bore of a guide sleeve 16. The valve element 14 is preferably formed of any suitable material such as fiber or hard rubber. The lower end of the rubber tube has a lateral annular flange 17 and extending into the tube is a reinforcing bush 18 having a flange 19. A washer 20 rests on an annular shoulder formed in the bushing 12 and the rubber tube 13 and its reinforcing bush 18 are clamped in position by the guide sleeve 16, the lower end of which has a screw-threaded engagement in the bore of the bushing 12 (see Fig. 2). A bolt 21 extends upwardly through the valve element 14 and secured to the upper end of said bolt is a circular nut or head 22 positioned within the discharge pipe 7 and serving as a guide for the valve, the head 22 being of less diameter than the bore of said pipe to allow for the passage of the fuel therethrough. The bushing 12 connects with the pressure line 4 in any suitable manner.

In operation, as the tank 3 becomes heated, the pressure therein being entrained by the pressure line 4 to the interior of the thermostat expansion element 13 functions to expand said element. As the walls of the rubber tube expansion element 13 are relatively thin, the tube will first expand transversely, the outer periphery of the tube walls grippingly engaging each convolution of the spring 15. Further pressure will expand the tube and spring longitudinally to elevate the valve element 14 to diminish the flow of fuel to the burner and to finally shut off said flow of fuel when the valve element engages the valve seat 8.

It will be noted that all of the parts excepting the rubber tube, the spring, wing collar and the body are susceptible of manufacture by automatic screw machinery and that the spring is of a uniform diameter such as may be cut into length from stock spring material. This contributes to minimizing the cost of manufacture and upkeep. The thermostat valve mechanism is very sensitive, responding promptly to slight variations of the operating pressure, and is very strong and durable and not likely to become disarranged and get out of order.

I claim:

1. A thermostat valve combining a body providing a valve chamber, a valve seat in said chamber, a valve element, a guide sleeve secured to the body in axial alinement with the valve element, a contractible coil spring secured to the sleeve and supporting the valve element, and a thermostat expansion element fixed at one end and longitudinally extended into the coil spring.

2. A thermostat valve combining a body providing a valve chamber, a valve seat in said chamber, a valve element, a bushing supported by the body in axial alinement with the valve seat, a guide sleeve on the bushing, a contractible coil spring secured to the sleeve and supporting the valve element, and a thermostat expansion element clamped at one end between the sleeve and bushing and extending longitudinally into the coil spring.

3. A thermostat valve combining a body providing a valve chamber, a valve seat in said chamber, a valve element, a bushing supported by the body in axial alinement with the valve seat, a guide sleeve on the bushing, a contractible coil spring secured to the sleeve and supporting the valve element, a hollow thermostat expansion element closed at one end, and a reinforcing bush engaged into the opposite end of said expansion element, the reinforcing bush and adjacent end of the expansion element being clamped between the sleeve and bushing.

4. A thermostat valve comprising a body providing a valve chamber, a valve seat in said chamber, a valve element, a contractible coil spring secured to the body and supporting the valve element, and a hollow rubber expansion element having one end closed and the other secured to the body, said expansion element extending longitudinally into the coil spring and adapted to expand transversely to engage the spring convolutions and longitudinally with the spring to translate the valve element.

Signed at Los Angeles, California this 6th day of January 1920.

ARTHUR C. THOMPSON.
WINFIELD S. ROBINETT.

Witnesses:
CLARENCE B. FOSTER,
L. BELLE WEAVER.